(12) United States Patent
Breuer et al.

(10) Patent No.: US 11,159,736 B2
(45) Date of Patent: Oct. 26, 2021

(54) CAMERA DEVICE AND METHOD FOR CAPTURING A REGION SURROUNDING A VEHICLE IN A SURROUNDINGS-ADAPTED MANNER

(71) Applicant: Conti Temic microelectronic GmbH, Nuremberg (DE)

(72) Inventors: Karsten Breuer, Oberreute (DE); Dieter Kroekel, Eriskirch (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/620,668

(22) PCT Filed: Jun. 12, 2018

(86) PCT No.: PCT/DE2018/200060
§ 371 (c)(1),
(2) Date: Dec. 9, 2019

(87) PCT Pub. No.: WO2019/001648
PCT Pub. Date: Jan. 3, 2019

(65) Prior Publication Data
US 2021/0084210 A1    Mar. 18, 2021

(30) Foreign Application Priority Data
Jun. 27, 2017    (DE) .................... 10 2017 210 845.2

(51) Int. Cl.
*H04N 5/235*    (2006.01)
*G06K 9/00*    (2006.01)

(52) U.S. Cl.
CPC ....... *H04N 5/2353* (2013.01); *G06K 9/00362* (2013.01); *G06K 9/00825* (2013.01)

(58) Field of Classification Search
CPC ............. H04N 5/2353; G06K 9/00362; G06K 9/00825
See application file for complete search history.

(56) References Cited

U.S. PATENT DOCUMENTS 7,272,207 B1 *   9/2007  Aufrichtig ............. A61B 6/032
                                                      378/116
8,405,494 B2    3/2013  Hilger et al.
(Continued)

FOREIGN PATENT DOCUMENTS

DE    102012024650    6/2014
DE    102014213801    1/2016
(Continued)

OTHER PUBLICATIONS

C. Jang, C. Kim, D. Kim, M. Lee and M. Sunwoo, "Multiple exposure images based traffic light recognition," 2014 IEEE Intelligent Vehicles Symposium Proceedings, 2014, pp. 1313-1318, doi: 10.1109/IVS.2014.6856541 (Year: 2014).*
(Continued)

*Primary Examiner* — Michael Robert Cammarata
(74) *Attorney, Agent, or Firm* — W. F. Fasse

(57) ABSTRACT

A camera device and a method are for optimally capturing a region surrounding a vehicle. The camera device includes an optronic unit and an image capturing control unit which are configured to acquire an image sequence of the surrounding region. The optronic unit includes a wide-angle lens and a high-resolution image acquisition sensor. The optronic unit and the image capturing control unit are configured to use at least two different exposure modes of the image acquisition sensor in combination with at least two different binning modes during the acquisition of the image sequence.

17 Claims, 2 Drawing Sheets

(56) References Cited

U.S. PATENT DOCUMENTS

| | | | |
|---|---|---|---|
| 8,743,202 B2 | 6/2014 | Schick et al. | |
| 8,872,918 B2 | 10/2014 | Kroekel | |
| 10,757,330 B2* | 8/2020 | Ash rati | H04N 5/23245 |
| 2008/0129541 A1* | 6/2008 | Lu | G06K 9/00791 |
| | | | 340/905 |
| 2008/0158430 A1* | 7/2008 | Hu | H04N 5/2351 |
| | | | 348/672 |
| 2008/0165258 A1* | 7/2008 | Wajs | H04N 5/3454 |
| | | | 348/222.1 |
| 2009/0219387 A1* | 9/2009 | Marman | H04N 5/235 |
| | | | 348/143 |
| 2011/0052095 A1* | 3/2011 | Deever | H04N 5/232 |
| | | | 382/300 |
| 2011/0193990 A1* | 8/2011 | Pillman | H04N 5/23232 |
| | | | 348/229.1 |
| 2013/0243283 A1 | 9/2013 | Kotchou et al. | |
| 2013/0321675 A1* | 12/2013 | Cote | H04N 9/045 |
| | | | 348/242 |
| 2013/0329075 A1* | 12/2013 | Liang | H04N 5/2256 |
| | | | 348/222.1 |
| 2015/0145951 A1 | 5/2015 | Ko | |
| 2015/0195463 A1* | 7/2015 | Koh | H04N 5/37457 |
| | | | 348/302 |
| 2015/0350575 A1 | 12/2015 | Agranov et al. | |
| 2015/0358567 A1* | 12/2015 | Sargent | H04N 5/347 |
| | | | 348/164 |
| 2015/0363914 A1 | 12/2015 | Boyle et al. | |
| 2016/0080653 A1* | 3/2016 | Kim | H04N 9/04557 |
| | | | 348/216.1 |
| 2017/0019605 A1 | 1/2017 | Ahiska | |
| 2017/0064179 A1* | 3/2017 | Richards | H04N 5/2355 |
| 2017/0212253 A1* | 7/2017 | Fu | A61B 6/4241 |
| 2018/0143684 A1* | 5/2018 | Kuldkepp | G06F 3/017 |
| 2018/0232947 A1* | 8/2018 | Nehmadi | G01S 17/931 |
| 2019/0026918 A1 | 1/2019 | Gomezcaballero et al. | |
| 2019/0281235 A1* | 9/2019 | Breuer | H04N 5/343 |
| 2020/0104983 A1* | 4/2020 | Wang | A61B 1/00009 |
| 2020/0110947 A1* | 4/2020 | Nakayama | G08G 1/16 |

FOREIGN PATENT DOCUMENTS

| | | | | |
|---|---|---|---|---|
| DE | 102015208889 | 11/2016 | | |
| EP | 1 033 694 | 9/2000 | | |
| EP | 2 455 891 | 5/2012 | | |
| EP | 2455891 A1 * | 5/2012 | ......... | G01N 21/6456 |
| WO | WO 2009/135460 | 11/2009 | | |

OTHER PUBLICATIONS

PCT Examiner Franck Sery, English translation of the International Search Report of the International Searching Authority for International Application PCT/DE2018/200060, dated Sep. 11, 2018, 3 pages, European Patent Office, HV Rijswijk, Netherlands.

PCT Examiner Nora Lindner, PCT International Preliminary Report on Patentability including English Translation of PCT Written Opinion of the International Searching Authority for International Application PCT/DE2018/200060, dated Dec. 31, 2019, 5 pages, International Bureau of WIPO, Geneva, Switzerland.

German Examiner Bernd Scholz, German Search Report for German Patent Application No. 10 2017 210 845.2, dated Jan. 3, 2018, 8 pages, German Patent and Trademark Office, Muenchen, Germany, with partial English translation, 7 pages.

Stephan Matzka et al., "Efficient Resource Allocation for Attentive Automotive Vision Systems", IEEE Transactions of Intelligent Transportation Systems, vol. 13, No. 2, Jun. 1, 2012, XP011445705, ISSN: 1524-9050, DOI: 10.1109/TITS.2011.2182610, pp. 859 to 872.

Stephan Matzka, "Efficient Resource Allocation for Automotive Active Vision Systems", PhD Thesis, Heriot-Watt University, Oct. 1, 2009, XP055392679, Retrieved from the Internet on Jul. 20, 2017: URL:http://www.ros.hw.ac.uk/bitstream/10399/2277/1/MatzkaS_201009_eps.pdf.

Eduardo Romera et al., "A Real-Time Multi-Scale Vehicle Detection and Tracking Approach for Smartphones", 2015 IEEE 18th International Conference on Intelligent Transportation Systems, Sep. 15, 2015, XP032804172, DOI: 10.1109/ITSC.2015.213, retrieved on Oct. 30, 2015, pp. 1298 to 1303.

\* cited by examiner

CAMERA DEVICE AND METHOD FOR CAPTURING A REGION SURROUNDING A VEHICLE IN A SURROUNDINGS-ADAPTED MANNER

FIELD OF THE INVENTION

The invention relates to a camera device and a method for optimally capturing a region surrounding a vehicle. The invention further relates to the vehicle having such a camera device.

BACKGROUND INFORMATION

In order to produce driver assistance devices such as e.g. traffic sign recognition or a lane departure warning system, camera systems require a horizontal viewing angle of approx. 50 degrees and a vertical viewing angle of approx. 30 degrees. However, new functions such as cross traffic or traffic light recognition notably require a much larger viewing angle in order to be able to capture objects located in the peripheral region of the image during tailgating. In contrast, highly automated driving or a lane departure warning system, for example, also requires recognition of objects and roadway structures at a great distance, necessitating a corresponding resolution.

DE 102015208889 A1 features a camera device for imaging an environment for a motor vehicle, having an image sensor apparatus for acquiring a pixel image and a processor apparatus which is configured to combine neighboring pixels of the pixel image in an adapted pixel image. Different adapted pixel images can be generated in different resolutions by combining the pixel values of the neighboring pixels in the form of a 2-x-2 image pyramid, in the form of a n-x-n image pyramid, or in the form of an m-x-n image pyramid. The combining of the pixel values of the neighboring pixels can also only be performed in a predetermined partial region of the pixel image, wherein the position and the size of the partial region can be modified.

A camera device for capturing a region surrounding an ego vehicle as described below serves as the starting point for the solution.

The surrounding region is, for example, a surrounding region lying in front of, to the side of and/or behind the ego vehicle in the direction of travel.

The camera device has an optronic unit which is designed to acquire an image sequence of the surrounding region.

The optronic unit comprises a wide-angle lens. The wide-angle lens is preferably configured with a horizontal and/or vertical viewing angle of e.g. at least +/−50 degrees, in particular of at least +/−70 degrees and/or of a maximum of +/−100 degrees to the optical axis. For example, a peripheral environment such as e.g. a crossroads area can be captured by means of the wide-angle lens for early object analysis of crossing road users. The viewing angles determine the field of view (FOV) of the camera device.

Furthermore, the optronic unit comprises a high-resolution image acquisition sensor. In particular, an object analysis such as e.g. the analysis of far-range road signs or lane markings, consequently in particular in a distance range from the ego vehicle of at least 50 meters, is made possible by means of the high-resolution image acquisition sensor. The term "high-resolution image acquisition sensor" denotes, in particular, an image acquisition sensor having a number of pixels of several megapixels, for example at least five megapixels, preferably at least seven megapixels, especially at least ten megapixels. The image acquisition sensor preferably has a homogeneous pixel/cm resolution.

Up to now, high-resolution image acquisition sensors have been deemed to be unsuitable for deployment in automotive technology, in particular in conjunction with a wide-angle lens, as they do not allow efficient processing of the large number of pixels for the elaborate image processing algorithms.

A camera device for capturing a region surrounding an ego vehicle according to the invention comprises an optronic unit and an image capturing control unit which are designed to acquire an image sequence of the surrounding region.

The optronic unit comprises a wide-angle lens and a high-resolution image acquisition sensor. The optronic unit and the image capturing control unit are designed or respectively configured to use at least two different exposure modes of the image acquisition sensor in combination with at least two different "binning modes" during the acquisition of the image sequence.

Different exposure modes can be adjusted e.g. by different exposure times at a given ambient brightness. For a given ambient brightness, the optimum exposure time is frequently utilized, which leads to the acquisition of normally exposed images. An exposure time which is shorter than the optimum exposure time leads to underexposed images. However, these can be sufficient or respectively better for detecting bright surrounding regions, in which e.g. active light sources or illuminated retroreflectors are located, since these image regions are overexposed during a normal exposure time. Motion blur which is caused by the proper motion of the ego vehicle and the camera device fastened therein at higher speed can additionally be minimized by shorter exposure times.

On the other hand, an exposure time which is longer than the optimum exposure time leads to overexposed images. This is nevertheless helpful in order to be able to detect objects in dark surrounding regions, e.g. pedestrians or animals near the roadway.

WO 2009/135460 A1 features a method for controlling the exposure of a camera system in a motor vehicle, in which images having a longer exposure time and images having a shorter exposure time can be alternately acquired for different driving assistance functions.

The combining of neighboring pixels into larger units is referred to as binning, e.g. two horizontally neighboring pixels respectively can be combined to produce a wide pixel or two vertically neighboring pixels respectively can be combined to produce a high pixel; this reduces the resolution compared with the maximum-resolution image (unbinned image), as a result of which it can however be further processed more quickly. In addition, the intensity of the combined pixel is increased compared with an individual pixel. The exposure time for acquiring an image can therefore be reduced in some circumstances. In the case of 2×2 binning, four neighboring pixels forming a pixel square are combined, in the case of 3×3 binning, nine pixels are combined, etc.

Two different binning modes are thus provided, e.g. by the acquisition or respectively production of unbinned vs. 2×2 binned images. Since unbinned images have a very high quantity of data, a partial region (region of interest, ROI) can be selected, which is supplied to further processing.

The pixel binning can already be effected in an analog or digital manner on the image sensor (imager). Alternatively, the pixel binning can, however, also be carried out in a processor unit connected to the image sensor. This can be effected either using hardwired logic or by means of a program/software. In all cases, an adapted image having a reduced resolution is produced from the original raw image.

A simple case of using two different exposure modes of the image acquisition sensor in combination with two different binning modes is provided by changing from the acquisition or respectively production of binned images exposed for a short time to the acquisition of unbinned images exposed for a long time. All in all, four different combined modes could be realized with the two different exposure modes of the image acquisition sensor and the two different binning modes: binned short-exposure; unbinned short-exposure; binned long-exposure and unbinned long-exposure.

The image capturing control apparatus corresponds to or is at least a part of the processing unit (e.g. system-on-chip, SoC), in which the "control program" of the image control (image capturing control) is run. One object of the image capturing control apparatus is, in particular, to control the production of resolution-reduced images or respectively to capture an image of a partial region having a maximum resolution using the optronic unit.

According to an advantageous embodiment, the optronic unit and the image capturing control unit are designed to acquire the image sequence according to a fixed order of the combinations of exposure and binning modes.

The optronic unit and the image capturing control unit are preferably designed to utilize three different exposure modes in order to acquire the image sequence: a first exposure mode having an optimum exposure time (normal exposure), a second exposure mode having an exposure time which is shorter than the optimum exposure time (underexposure), and a third exposure mode having an exposure time which is longer than the optimum exposure time (overexposure).

The optronic unit and the image capturing control unit are preferably designed to specify a first binning mode in order to acquire or respectively produce a binned "overview image", that is to say an image of the entire capturing region of the camera device having a reduced resolution, and a second binning mode in order to acquire an unbinned partial region, that is to say an image section (ROI) having a maximum resolution of the camera device.

According to an advantageous further development, the optronic unit and the image capturing control unit are designed to determine the exposure mode for the acquisition of the unbinned partial region from at least one previous binned acquisition. If binned overview images have been acquired or respectively produced in several different exposure modes, the exposure mode which has shown the best result (in particular in terms of contrast) for the image region of interest can be chosen for the acquisition of the unbinned partial region.

In another advantageous embodiment, the optronic unit and the image capturing control unit are designed to adaptively perform the "switchover" (i.e. the specification of an altered exposure and/or binning mode (s) for an image to be acquired) by predefining a specific combination of binning and exposure modes for the acquisition or production of one image of the image sequence, as a function of
the result of the image analysis of at least one previous image of the image sequence;
vehicle data (vehicle movement data, vehicle speed, etc.), and/or
the system status of the camera device (temperature, processor resources, etc.). In this embodiment, there is no strict periodic change of defined combined exposure and operation modes.

Depending on a current traffic or respectively surroundings situation it can, on the one hand, be specified whether e.g. a binned "overview image" of the complete capturing region of the optronic unit or an unbinned image of a specified partial region or of the entire capturing region is to currently be acquired or respectively produced. The partial region can be adapted to the current situation in terms of the position, height and width. Additionally, a situation-adapted exposure mode can be specified if this is required.

Current traffic or respectively surrounding situations can be e.g.:
motorway driving
cross-country driving
driving straight-ahead
driving involving numerous bends
urban traffic
crossroads situation
traffic light control
zebra crossings
overtaking maneuvers, and/or
risk of collision (stationary obstacle, moving obstacle, pedestrian, cyclist, animal, etc.).

According to a preferred embodiment, the optronic unit and the image capturing control unit are designed to make a selection regarding which image of the image sequence that has been acquired/produced with a selected exposure and binning mode is supplied to an image analysis, which depends on
the result of the image analysis of at least one previous image of the image sequence,
vehicle data, and/or
the system status of the camera device.

This is in particular advantageous if three images are always cyclically produced or respectively acquired in specified combined modes, however only one of these three images is to be analyzed within the framework of an image processing, e.g. in order to detect objects.

The optronic unit and the image capturing control unit are preferably designed to adjust the exposure time or further parameters of the image acquisition sensor individually in the various exposure modes, as a function of
the result of the image analysis of at least one previous image of the image sequence,
vehicle data, and/or
the system status of the camera device.

The optronic unit and the image capturing control unit are preferably designed to determine the surroundings of the vehicle, road users and/or light conditions of the surroundings as a result of the image analysis.

The invention further relates to a method for capturing a region surrounding an ego vehicle by means of a camera device, comprising
acquiring an image sequence of the region surrounding the vehicle by means of an optronic unit, wherein the optronic unit comprises a wide-angle lens and a high-resolution image acquisition sensor,
wherein at least two different exposure modes of the image acquisition sensor are used in combination with at least two different binning modes during the acquisition of the image sequence.

BRIEF DESCRIPTION OF THE DRAWINGS

Preferred exemplary embodiments of the invention are explained in greater detail below with reference to schematic drawings, wherein.

DETAILED DESCRIPTION OF EXAMPLE EMBODIMENTS OF THE INVENTION

Figure 1:
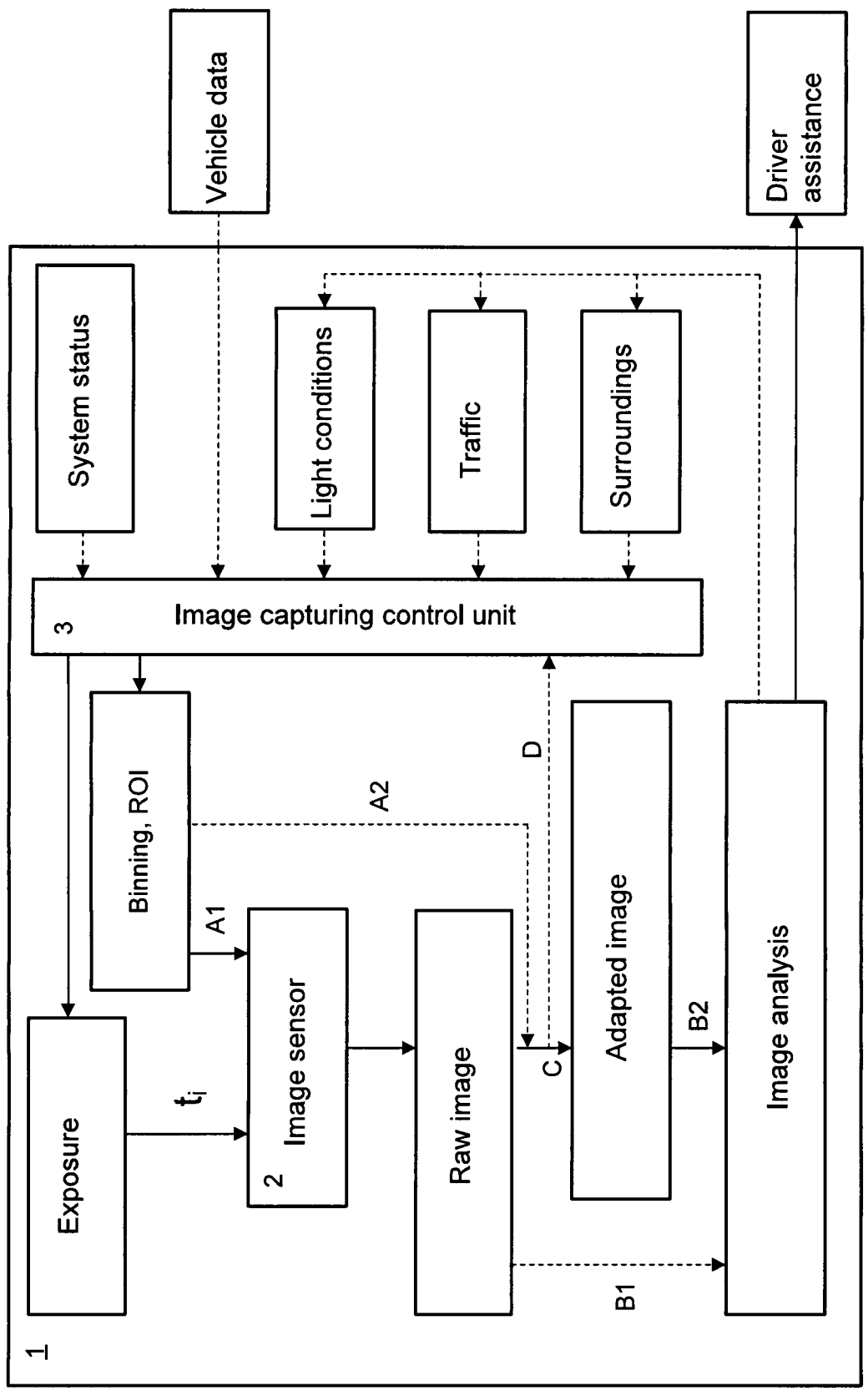
FIG. 1 schematically shows a camera device 1 for capturing a region surrounding an ego vehicle with an image capturing control unit.

FIG. 1 schematically shows a diagram of a camera device 1 for capturing a region surrounding an ego vehicle with an optronic unit having a wide-angle lens (not represented) and a high-resolution image sensor 2 and an image capturing control unit 3.

The image capturing control unit 3 specifies a mode of exposure, e.g. by means of an exposure parameter—in particular the exposure time $t_i$—and a mode of binning for an image to be acquired, if necessary with a defined region of interest (ROI, image section).

A combining of multiple neighboring pixels in order to produce a resolution-reduced image is referred to as pixel binning. The pixel binning can already be effected in an analog or digital manner on the image sensor 2 (arrow A1). Alternatively, the pixel binning can, however, also be carried out in a processor unit connected to the image sensor 2 (dashed arrow A2). This can be effected there either using hardwired logic or by means of a program/software. An adapted image having a reduced resolution (arrow C) is produced from the original raw image.

The raw image, that is to say the image having maximum resolution (arrow B1), or the adapted image (arrow B2) can be supplied to the image analysis.

In the case of a fixed order of the different combinations of modes, the image capturing control unit 3 can receive the information from the image sensor 2 that the raw image has been detected and how this was done (arrow D). In particular, the image sensor also provides histogram data of the captured image to the image capturing control unit 3. The image capturing control unit 3 can then stipulate the exposure and binning modes for the image to be acquired subsequently.

The specification of the combined exposure and binning modes for the next image to be acquired depends only on the time, not on the result of the image analysis or external data such as e.g. vehicle data or the system status of the camera device 1. The image capturing control unit 3 rotates a specified order of combined exposure and binning modes periodically.

One of the two simplest periodically changing operating modes of the camera device 1 consists of changing the acquisition or respectively production of a binned, short-exposure image to the acquisition of an unbinned, long-exposure image.

The second operating mode then consists of changing between the acquisition of unbinned, short-exposure images and the acquisition or respectively production of binned, long-exposure images.

All in all, four different combinations can consequently be constituted, with two modes each for exposure and binning.

Figure 2:
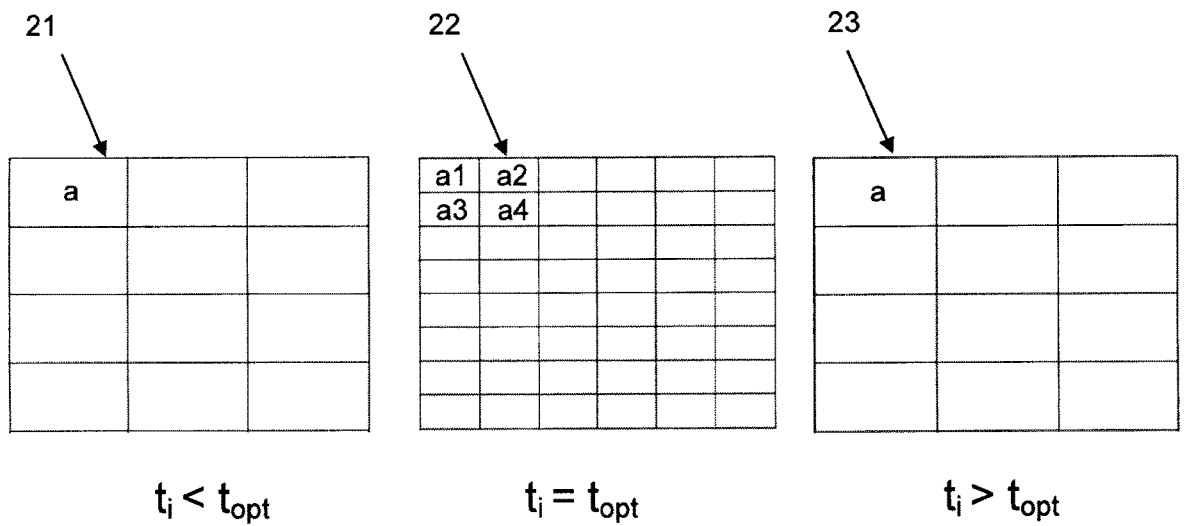
FIG. 2 shows a sequence of three images that have been captured or respectively produced with different exposure and binning modes.

FIG. 2 shows by way of example an exemplary embodiment, in which a sequence of three images is acquired. The first image 21 is acquired with a shorter exposure time than the optimum exposure time and with a 2×2 binning (cell a corresponds to 4 individual pixels) or is respectively produced from an unbinned acquisition. The second image 22 is captured with an optimum exposure time and in an unbinned manner (symbolized by four pixels a1 to a4). The third image 23 is acquired with an exposure time which is longer than the optimum exposure time and with 2×2 pixel binning (cell a).

This order can be retained in an unaltered form during the capturing of the entire image sequence.

An alternative embodiment of a fixed order consists of continuing the exposure times respectively ($4^{th}$ image shorter, $5^{th}$ image optimum, $6^{th}$ image longer) following the capturing of the three images as in FIG. 2, but rotating which image is captured in an unbinned manner, that is to say e.g. the $6^{th}$ image is unbinned instead of the $5^{th}$ image and subsequently the $7^{th}$ image (which is, in turn, exposed for a shorter time) instead of the $8^{th}$ or $9^{th}$ image.

Figure 3:
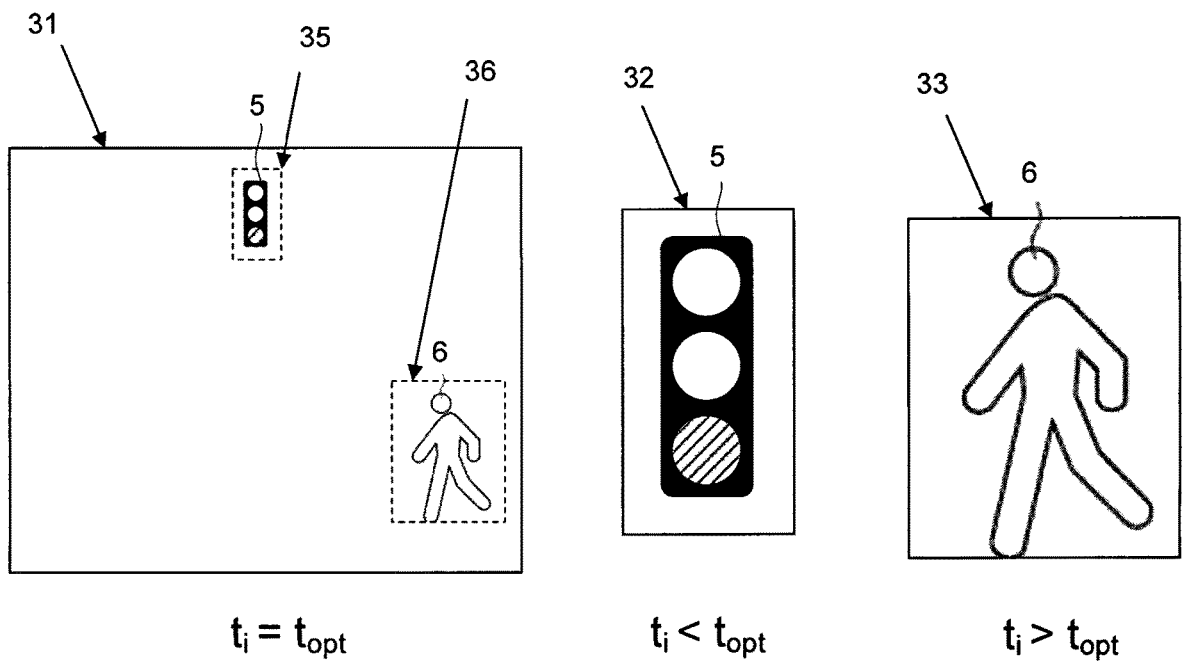
FIG. 3 shows a sequence of three images: an overview image and two detailed images.

FIG. 3 is intended to illustrate an alternative preferred exemplary embodiment:

A binned image having an optimum exposure time is acquired (or respectively produced from the acquisition) as the first image 31. The image might have been captured at dusk. The diagram schematically shows a traffic light 5 and a pedestrian 6 that have been captured in the first image. The first image 31 can be supplied to image processing, which recognizes image regions 35, 36 (RoIs) having potentially relevant objects 5, 6 in the surroundings of the vehicle or respectively road users surrounding the vehicle in this image 31. During the image analysis it is established that the region 35 having the traffic light 5 has been captured with an excessive light intensity. This is due to the fact that the traffic light 5 is an active light source. The image analysis furthermore reveals that the region 36 with the pedestrian 36 has been captured with too low a light intensity, e.g. since the pedestrian is wearing dark clothing.

This information is transmitted by the image analysis to the image capturing control unit 3. The image capturing control unit 3 then stipulates that the second image 32 should be captured with a shorter exposure time and be restricted to the image region 35 having the traffic light 5, but it captures this in an unbinned manner.

The image capturing control unit 3 furthermore stipulates that the third image 33 should be captured with a longer exposure time and captures the image region 36 having the pedestrian 6 in an unbinned manner.

The second and the third images are supplied to image processing which, as a consequence of the optimized exposure and resolution (or respectively binning) adjustments from the second and third images, can actually recognize the relevant objects, namely the green traffic light 5 and the pedestrian 6 walking in the direction of the image center of the first image 31. On the basis of said image analysis, a warning is output to the driver of the vehicle as a driver assistance function, since there is a risk of a collision with the pedestrian who is about to cross the roadway or crossroads lying in front, although the traffic light is showing green for the vehicle. In this way, the surroundings lying in front of the vehicle and the surrounding traffic can be recognized more quickly and more reliably than with conventional camera devices.

In FIG. 1, further input sources are schematically represented, which can be considered by the image capturing control unit 3. The current light conditions (ambient brightness) can be established from the image analysis of a previously captured image, and the exposure mode for future images can accordingly be adapted to the current light conditions.

The system status of the camera device can be taken into account in that e.g. at a temperature of the camera device, which exceeds a threshold, the image capturing control unit 3 adjusts an exposure and operating mode which lowers the energy and processor requirements of the entire system.

In order to optimally avoid motion blur in the images which are to be acquired, the image capturing control unit 3 can receive vehicle data, in particular regarding the dynamics with which the vehicle is currently moving, that is to say e.g. the current vehicle speed. On the basis of said vehicle data, the exposure time can in turn be adapted thereto.

It can be specified by the image capturing control unit 3 that the exposure mode, that is to say the exposure time or further parameters for the optronic unit or respectively the image sensor, only be adapted for one image of a cyclical image sequence. In the example from FIG. 2, e.g. the exposure time of the first image 21 could be adapted to the current vehicle speed, while the exposure times of the second 21 and third images 23 are not varied with the vehicle speed.

The invention claimed is:

1. An apparatus for a vehicle, comprising a driver assistance system and a camera device for capturing a region of a surrounding environment of the vehicle, wherein the camera device is mounted on the vehicle, and the camera device comprises:
   an optronic unit and an image capturing control unit which are configured to capture an image sequence of the region,
   wherein the image capturing control unit comprises a processor, and the optronic unit comprises a wide-angle lens and a high-resolution image acquisition sensor,
   wherein the optronic unit and the image capturing control unit are configured to use at least two different exposure modes of the image acquisition sensor including a lower exposure mode that provides a lower image exposure and a higher exposure mode that provides a higher image exposure which is more highly exposed than the lower image exposure in combination with at least two different binning modes including an unbinned image mode that produces unbinned images and a binned image mode that produces binned images during the capture of the image sequence, so as to be able to provide a plurality of the unbinned images having the lower image exposure, a plurality of the unbinned images having the higher image exposure, a plurality of the binned images having the lower image exposure, and a plurality of the binned images having the higher image exposure, and
   wherein the camera device is connected to the driver assistance system so as to supply the image sequence to the driver assistance system.

2. The camera device according to claim 1, wherein the optronic unit and the image capturing control unit are configured to capture the image sequence according to a fixed order of combinations of the exposure modes and the binning modes.

3. The camera device according to claim 1, wherein the at least two different exposure modes include a first exposure mode having an optimum exposure time, a second exposure mode having a shorter exposure time that is shorter than the optimum exposure time, and a third exposure mode having a longer exposure time that is longer than the optimum exposure time.

4. The camera device according to claim 1, wherein the binned images include a binned overview image of an entire scene in the region, and the unbinned images include an unbinned partial region image of a portion of the scene in the region.

5. The camera device according to claim 4, wherein the optronic unit and the image capturing control unit are configured to determine which one of the exposure modes to use for capturing the unbinned partial region image from at least a previous one of the binned images.

6. The camera device according to claim 1, wherein the optronic unit and the image capturing control unit are configured to adaptively specify which one of the exposure modes and/or which one of the binning modes is to be used for capturing a respective one of the images by predefining a specific combination of the binning modes and the exposure modes as a function of:
   a result of an image analysis of at least one previous image of the image sequence,
   vehicle data, and/or
   a system status of the camera device.

7. The camera device according to claim 1, wherein the optronic unit and the image capturing control unit are configured to select which one of the images, which has been captured with a selected one of the exposure modes and a selected one of the binning modes, is supplied to an image analysis, dependent on:
   a result of the image analysis of at least one previous image of the image sequence,
   vehicle data, and/or
   a system status of the camera device.

8. The camera device according to claim 1, wherein the optronic unit and the image capturing control unit are configured to adjust an exposure time or other parameters of the image acquisition sensor individually in one of the exposure modes as a function of:
   a result of an image analysis of at least one previous image of the image sequence,
   vehicle data, and/or
   a system status of the camera device.

9. The camera device according to claim 1, wherein the optronic unit and the image capturing control unit are configured to determine the surrounding environment of the vehicle, road users and/or light conditions of the surrounding environment as a result of an image analysis of the images.

10. The camera device according to claim 3, wherein the image sequence as captured includes one of the unbinned images having the optimum exposure time, one of the binned images having the shorter exposure time, and one of the binned images having the longer exposure time.

11. The camera device according to claim 3, wherein the image sequence as captured includes one of the binned images having the optimum exposure time, one of the unbinned images having the shorter exposure time, and one of the unbinned images having the longer exposure time.

12. The camera device according to claim 11, wherein the binned image having the optimum exposure time is an overview image of an entire scene in the region, and the unbinned images having the shorter exposure time and the longer exposure time are respective partial region images of portions of the scene in the region.

13. A method of capturing a region of a surrounding environment of a vehicle by camera device mounted on the vehicle, comprising:
   capturing an image sequence of the region by an optronic unit of the camera device, wherein the optronic unit comprises a wide-angle lens and a high-resolution image acquisition sensor, wherein at least two different exposure modes of the image acquisition sensor are used in combination with at least two different binning modes during the capture of the image sequence, wherein the exposure modes include a lower exposure mode that provides a lower image exposure and a higher exposure mode that provides a higher image exposure which is more highly exposed than the lower image exposure, and the binning modes include an unbinned image mode that produces unbinned images and a binned image mode that produces binned images, so as to be able to provide a plurality of the unbinned images having the lower image exposure, a plurality of the unbinned images having the higher image exposure, a plurality of the binned images having the lower image exposure, and a plurality of the binned images having the higher image exposure, and further comprising supplying the image sequence to a driver assistance system of the vehicle.

14. The method according to claim 13, wherein the at least two different exposure modes include a first exposure mode having an optimum exposure time, a second exposure mode having a shorter exposure time that is shorter than the optimum exposure time, and a third exposure mode having a longer exposure time that is longer than the optimum exposure time.

15. The method according to claim 14, wherein the image sequence as captured includes one of the unbinned images having the optimum exposure time, one of the binned images having the shorter exposure time, and one of the binned images having the longer exposure time.

16. The method according to claim 14, wherein the image sequence as captured includes one of the binned images having the optimum exposure time, one of the unbinned images having the shorter exposure time, and one of the unbinned images having the longer exposure time.

17. The method according to claim 16, wherein the binned image having the optimum exposure time is an overview image of an entire scene in the region, and the unbinned images having the shorter exposure time and the longer exposure time are respective partial region images of portions of the scene in the region.

* * * * *